United States Patent [19]
Ford et al.

[11] Patent Number: 5,303,319
[45] Date of Patent: Apr. 12, 1994

[54] ION-BEAM DEPOSITED MULTILAYER WAVEGUIDES AND RESONATORS

[75] Inventors: Carol M. Ford, Columbia Heights; Theodore J. Podgorski, St. Paul; Randy J. Ramberg, Roseville; Charles T. Sullivan, Burnsville, all of Minn.

[73] Assignee: Honeywell Inc., Minneapolis, Minn.

[21] Appl. No.: 997,994

[22] Filed: Dec. 28, 1992

[51] Int. Cl.[5] .............................................. G02B 6/10
[52] U.S. Cl. ..................................... 385/131; 385/141
[58] Field of Search .............................. 385/129-132, 385/141; 359/359, 580, 586, 588

[56] References Cited

U.S. PATENT DOCUMENTS

| | | | |
|---|---|---|---|
| 3,970,360 | 7/1976 | Kersten et al. | 385/131 X |
| 4,846,541 | 7/1989 | Miura et al. | 385/131 |
| 4,880,288 | 11/1989 | Vatoux et al. | 385/2 |
| 4,901,321 | 2/1990 | Blondeau et al. | 372/7 |
| 5,043,991 | 8/1991 | Bradley | 385/130 X |
| 5,111,466 | 5/1992 | Normandin et al. | 385/131 X |
| 5,123,027 | 6/1992 | Lawrence | 372/92 |
| 5,144,498 | 9/1992 | Vincent | 359/359 X |
| 5,157,746 | 10/1992 | Tobita et al. | 385/131 X |

FOREIGN PATENT DOCUMENTS

| | | | |
|---|---|---|---|
| 63-218902 | 9/1988 | Japan | 385/131 |
| 1-230005 | 9/1989 | Japan | 385/131 |

OTHER PUBLICATIONS

"Polymeric Optical Waveguides", Hagerhorst et al., SPIE vol. 1177 Integrated Optics and Optoelectronics (1989), pp. 379–386.

"Mixed-Metal-Oxide Planar Optical Waveguides", Arjavalingam et al., J. Vac. Sci. Technol. A, vol. 7, No. 3, May/Jun. 1989, pp. 1294–1297.

"Rare-Earth-Doped Waveguide Devices: The Potential for Compact Blue-Green Lasers", Sanford et al., National Institute of Standards Technology, Optical Electronic Metrology Group, 814.02, 4 pages (undated).

*Primary Examiner*—John D. Lee
*Attorney, Agent, or Firm*—Craig J. Lervick

[57] ABSTRACT

An optical waveguide is formed by depositing multiple layers of thin films using the process of ion beam sputter deposition. The waveguide is made up of alternating layers of a first material and a second material wherein the two materials have differing indices of refraction and low optical loss. These materials are deposited upon a thermally stable substrate creating a multilayer stack which functions as a waveguide. The multilayer waveguide has ultra low propagation losses and good mode discrimination, thus being very efficient for use in single mode applications. The waveguide is easily adaptable to batch processing which reduces costs and increases the performance of the waveguide.

26 Claims, 4 Drawing Sheets

5,303,319

ION-BEAM DEPOSITED MULTILAYER WAVEGUIDES AND RESONATORS

BACKGROUND OF THE INVENTION

The present invention relates to solid state optical waveguides which can be used for a number of applications requiring the transmission of optical signals. Furthermore, the invention may be used to form closed loop optical resonators.

Optical waveguides have become increasingly popular for a number of purposes including optical communications, optical signal processing, optical interconnects, optical sensing and many other applications where optical signals need to be transmitted from one point to another. Furthermore, optical waveguides are being investigated for use as resonant sensing elements in rotation measuring instruments.

In the field of optical waveguides propagation loss within the waveguide is a primary concern. The amount of propagation loss will effect the operability and efficiency of the waveguide. Generally, optical waveguides are designed to be low loss devices. However it is advantageous to further minimize all propagation losses within the waveguide. Any propagation loss within the waveguide degrades light wave transmission because the signals being transmitted will attenuate over distances. This creates the need for ultra low loss waveguides which are capable of transmitting signals over relatively large distances. Furthermore, ultra low loss waveguides will be beneficial to many other waveguide applications.

Optical waveguides can be fabricated using a wide variety of techniques, including deposition, diffusion, ion-exchange, and the use of nonlinear optical effects. One approach uses thin film deposition in which the optical waveguides are fabricated by depositing material upon a substrate and then etching or carving away unwanted portions to create a channel waveguide. Many methods of depositing material for waveguide fabrication have been attempted. Some attempts have met with success while others have continually encountered the problems of propagation loss. Examples of the deposition techniques used to fabricate waveguides include magnetron sputtering and chemical vapor deposition.

The methods by which a waveguide is fabricated can greatly effect its characteristics. A number of factors can contribute to the efficiency and performance of the deposited waveguide. First, the material making up the waveguide should be homogeneous and free of impurities. Any impurities within the material will cause an increase in propagation loss through scattering and absorption, while inhomogeneities will cause scattering loss. Additionally, it is essential that the dimensions of the waveguide be controlled with high uniformity over large areas. Any variations in the waveguide dimensions will cause additional propagation loss due to changes in the optical mode structure along the waveguide.

During fabrication excess handling can cause impurities and irregularities in the waveguides. It is desirable to fabricate the waveguides using a process which requires little, if any, physical handling of the waveguides, thus reducing the possibility of creating impurities and irregularities.

SUMMARY OF THE INVENTION

It is an object of the present invention to fabricate an ultra low loss waveguide for use in many waveguide applications including communications and optical resonators.

It is a further object of the invention to create waveguides that are easily reproducible and adaptable to batch processing and batch manufacturing.

The optical waveguide of the present invention is constructed of a multilayer or multicycle stack of materials which are deposited upon a thermally stable substrate. The multilayer stack is made of two materials. The two materials used have differing indices of refraction. A first material is used which has a relatively low index of refraction and a second material is used which has a relatively high index of refraction. These two materials are alternately deposited on top of a low index of refraction substrate to form a multilayer waveguide.

In one embodiment of the present invention the materials of the stack include alternating layers or cycles of silicon dioxide ($SiO_2$) and zirconium dioxide ($ZrO_2$). The multilayer structure using these two materials provides a waveguide that has low losses. Furthermore, the resulting waveguide displays many characteristics which are advantageous for single mode light propagation, including mode discrimination and beneficial birefringence.

The materials of the optical waveguide are deposited onto the substrate using ion beam sputtering techniques. By depositing materials through ion beam sputtering the thin films that are sputtered upon the substrate are uniform and easily controlled. Also, the purity of materials is maintained throughout processing. Furthermore, the process of ion beam sputtering is very efficient and operates at lower temperatures thus avoiding the problems associated with high temperature thin film deposition.

BRIEF DESCRIPTION OF THE DRAWINGS

Further objects and advantages of the present invention will become apparent after reading the following detailed description of the invention in conjunction with the attached drawings in which.

DETAILED DESCRIPTION OF THE INVENTION

Figure 1:
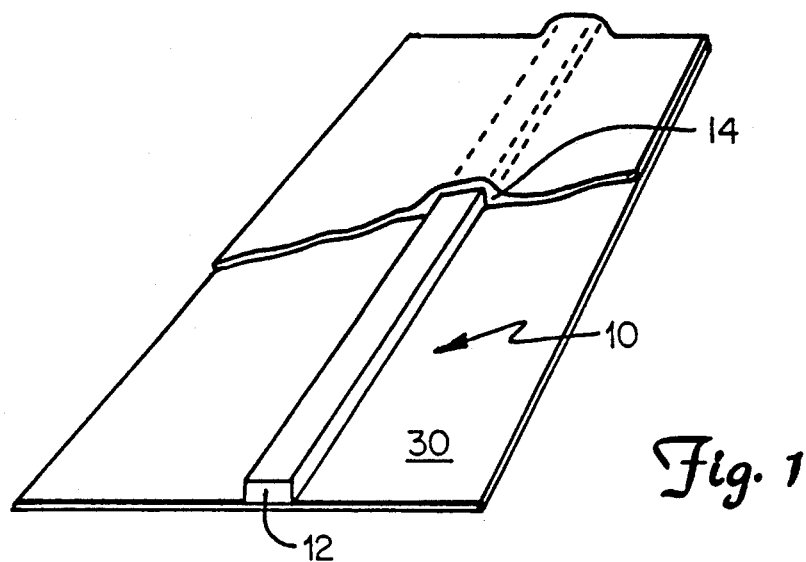
FIG. 1 is a perspective view of a waveguide which is formed upon the surface of the substrate.

Referring to FIG. 1 there is shown an optical waveguide 10 configured as a linear channel. In this configuration waveguide 10 can be used for transmission of signals from one end of the waveguide to the other. Waveguide 10 comprises a stack of material 12 which is attached to a substrate 30. A protective coating or upper isolation layer 14 is placed on top of both multilayer stack 12 and substrate 30. Upper isolation layer 14 can shield the waveguide from environmental attacks such as moisture, chemical attack, etc. Furthermore, upper isolation 14 helps to reduce propagation loss by forming a containment layer over the top of and along the sides of waveguide stack 12. The resulting structure is a buried optical channel waveguide.

Figure 2:
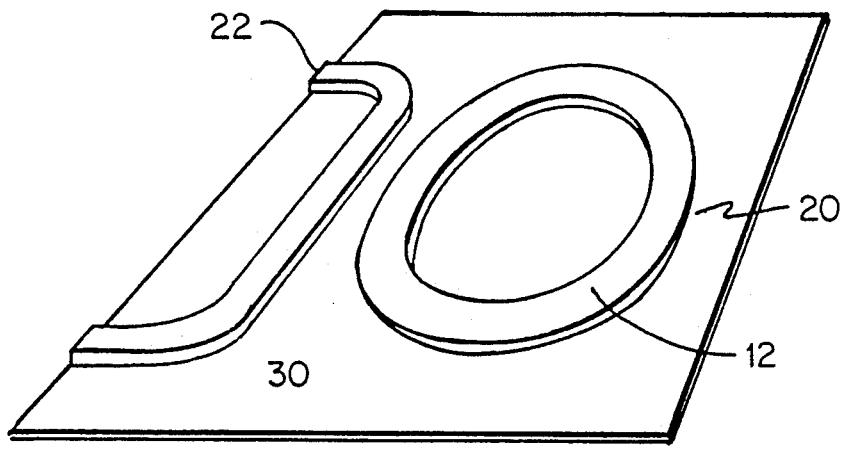
FIG. 2 is a perspective view showing the waveguide of the present invention configured as a ring so as to form a ring resonator.

Referring now to FIG. 2 there is shown an optical waveguide configured as a ring 20. In this configuration the waveguide can be used as a ring resonator causing optical signals to resonate within a closed loop path. To cause signals to resonate within ring 20, light must be coupled into the ring resonator. A coupler 22 is deposited on substrate 30 and is positioned alongside ring waveguide 20. Light is coupled into ring waveguide 20 thus creating a resonator. Other well known methods of optical coupling can be used to couple optical signals into ring 20, thus creating a ring resonator.

Ring 20 is constructed much the same as linear strip waveguide 10, comprising a multilayer stack which is attached to substrate 30. Although not shown in FIG. 2, an isolation layer, as shown in FIG. 1, is layered upon the top of and down the sides of ring 20.

Those skilled in the art will recognize that the waveguides can be fabricated in an infinite number of configurations to accomplish different goals and purposes. Other configurations include splitters, branches and curves to accommodate various goals.

Figure 3:
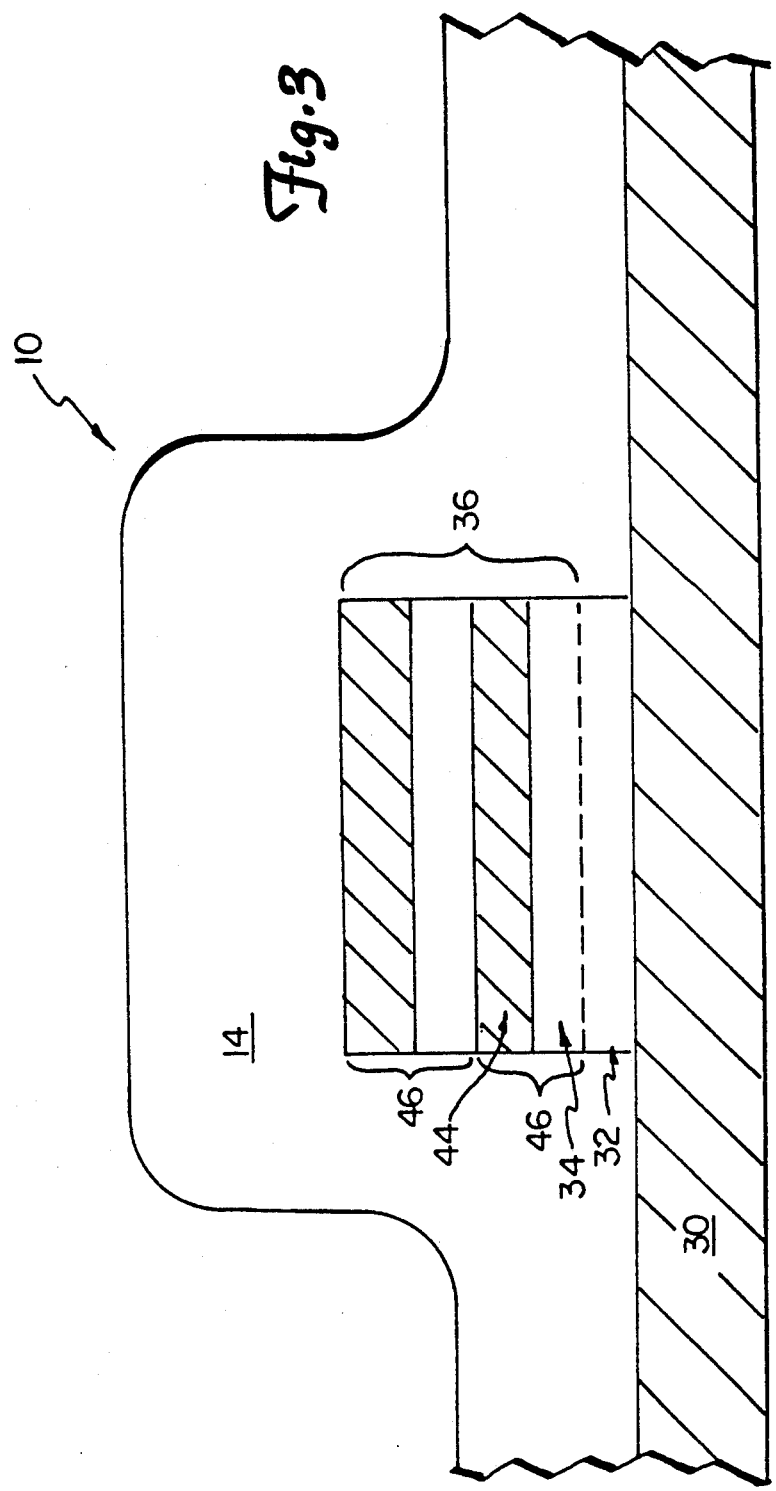
FIG. 3 is a cross-sectional diagram of the waveguide of the present invention.

Referring now to FIG. 3 there is shown a cross sectional diagram of both linear strip waveguide 10 and ring waveguide 20. This cross section diagram illustrates the multilayer or multicycle nature of the optical waveguide of the present invention. Throughout the present description, the term "layer" or "layers" is used to describe the structure of the waveguide. It will be understood that "layer" may refer to a distinct region of material having definite edges, while it may also refer to a region of material wherein the edges between "layers" are not distinct but are graded or blended.

Initially, a low index of refraction first isolation layer or lower isolation layer 32 is deposited or grown on top of substrate 30. First isolation layer 32 is made of a material having a low index of refraction and low optical loss and is used to contain the light waves within the waveguide. In the preferred embodiment of the invention, first isolation layer 32 is silicon dioxide ($SiO_2$). Many different materials could be used for substrate 30, depending upon the particular design requirements of the waveguide. Examples of material which could be used to make up substrate 30 are silicon, silicon dioxide and low coefficient of expansion glass materials such as Zerodur (Zerodur is a trademark referring to a specific type of glass manufactured by the Schott Optical Glass Company).

Upon first isolation layer 32 are placed a number of layers or cycles of material which make up multilayer stack 36. Multilayer stack 36 is made up of alternating layers or cycles of a first material 34 having a low index of refraction and a second material 44, having a high index of refraction. Differing materials may be used in multilayer stack 36 so long as the index of refraction of the first material 34 is sufficiently lower than the index of refraction of the second material 44, and that the optical loss of each material is sufficiently low. The particular goals for the waveguide will govern the selection of materials and the thickness of the layers.

The initial layer, or bottom layer 34 of multilayer stack is a layer of a first material 34 having a low index of refraction. In the preferred embodiment of the invention bottom layer 34 is silicon dioxide ($SiO_2$). Upon bottom layer 34 is a second layer of second material 44 having a relatively high index of refraction. In the preferred embodiment second layer 44 is zirconium dioxide ($ZrO_2$) doped with silicon dioxide ($SiO_2$). Bottom layer 34 and second layer 44 form a pair of layers 46. Layer pair 46 is then repeated a number of times to form multilayer stack 36.

FIG. 3 illustrates a multilayer stack 36 having four layers of material, two layers of first material 34 and two layers of second material 44. The number of layers actually used in the waveguide may vary greatly depending upon the application and the materials used.

On the top of multilayer stack 36 is an upper isolation layer or a second isolation layer 14. The material of second isolation layer 14 has a low index of refraction as does first isolation layer 32. In the preferred embodiment of the invention, this material is again silicon dioxide ($SiO_2$). First isolation layer 32 and second isolation layer 14 help to reduce losses of any optical signals traveling through the waveguide by helping to reduce the effect of surface scattering of the signals within the waveguide. Second isolation layer 14 also covers the edges of multilayer stack 36 which further reduces propagation loss within the waveguide.

A number of different materials may be used in fabricating multilayer stack 36, however it is important that first material 34 and second material 44 have sufficiently different indices of refraction. First material 34 will generally have a relatively low index of refraction, while second material 44 will generally have a high index of refraction. In the preferred embodiment of the present invention, silicon dioxide ($SiO_2$) is used for first material 34, while a mixture of ninety percent (90%) zirconium dioxide ($ZrO_2$) and ten percent (10%) silicon dioxide ($SiO_2$) is used for second material 44. A large number of alternative materials could also be used. For example, first material 34 and second material 44 could be silicon dioxide ($SiO_2$) and titanium dioxide ($TiO_2$), or silicon dioxide ($SiO_2$) and tantalum pentoxide ($Ta_2O_5$), respectively.

In the preferred embodiment the layers or cycles making up multilayer stack 36 do not have distinct edges whereby one material ends and another material starts. Rather, there exists a graded transition wherein the materials are mixed together for some distance. While they are not distinct and identifiable layers, the multilayer stack 36 still has numerous layers of material or variations in material as the waveguide is traversed.

Figure 4:
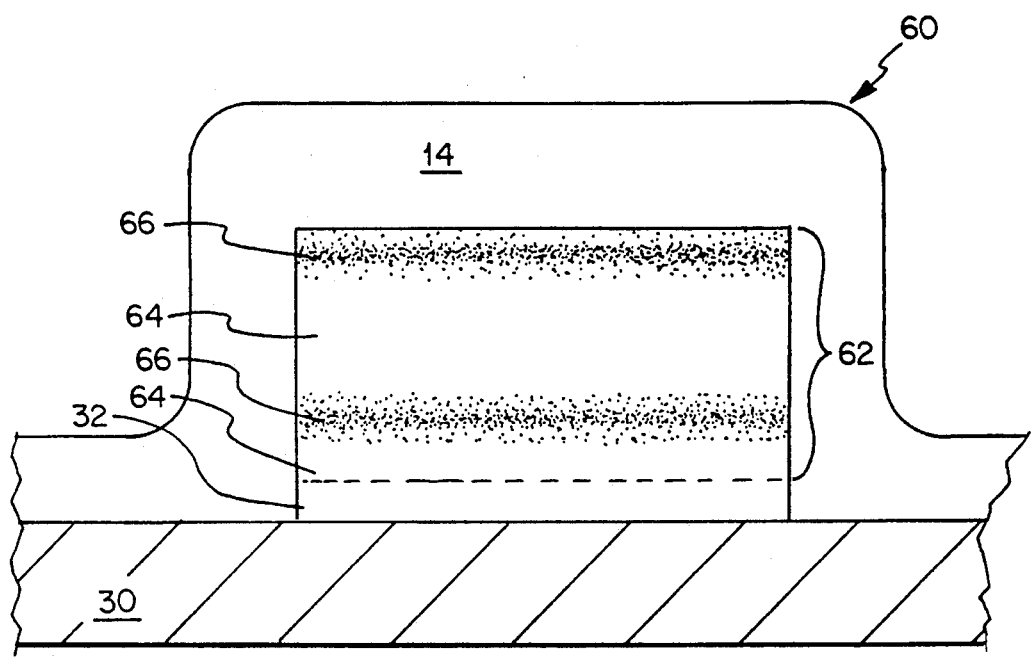
FIG. 4 is a cross-sectional diagram of a waveguide in accord with the present invention wherein the waveguide is a structure having material variations as opposed to distinct layers.

Referring now to FIG. 4, there is shown a cross section of the preferred embodiment of the present invention. The structure of this embodiment, as eluded to, illustrates that the waveguide need not be made up of distinct layers. Alternatively, the waveguide 60 may be constructed so as to have material variations as the waveguide is traversed. These material variations would be shifts from a first material 64 to a second material 66 with a graded interface there between.

The waveguide 60 of FIG. 4, is attached to a substrate 30. Upon the substrate is a first isolation layer 32. Attached to first isolation layer 32 is a waveguide core 62. Waveguide core 62 is made up of a combination of a first material 64 and a second material 66. As waveguide core 62 is traversed upward from first isolation layer 32, graded variation in material are encountered. These variations are transitions between first material 64 and second material 66. Attached to the top of waveguide core 62 is a second isolation layer 14.

The method by which all of the layers of material are fabricated may effect the efficiency of the waveguide. This includes layers of first material 34, layers of second material 44 and second isolation layer 14. In the present invention it is advantageous to use ion beam deposition to deposit the different layers of material. Ion beam deposition is a process which is well known in the art. In summary, ion beam deposition is accomplished by bombarding a target material with a flow of ions causing particles of the target material to be dislodged and deposited upon surrounding surfaces. The advantages of using ion beam deposition include achieving stoichiometry and homogeneity in the thin film which is deposited, maintaining the density of the deposited thin film, the ability to deposit materials without using excessive amounts of heat, and the adaptability of ion beam deposition to batch processing of parts. Furthermore, ion beam deposition provides the capability to easily blend materials as well as create graded interfaces between materials. All of these characteristic of ion beam deposition provide the waveguide of the present invention with the quality needed as well as the low cost desired.

Ion beam deposition creates a thin film of material which is very uniform and which maintains its purity. The layers which result have very high density and replicate the target material very closely. This helps to reduce propagation loss because, as previously mentioned, propagation losses can be caused by impurities within a waveguide. Ion beam deposition also provides for great flexibility in the production of thin films of material, including the ability to control the thickness of films being deposited.

Referring again to FIG. 3, the process by which the waveguides of the present invention are created will now be summarized. The waveguides of the present invention are manufactured by first polishing substrate 30. Next, isolation layer 32 is grown on the entire surface of polished substrate 30. A pattern is then placed on the isolation layer 32 and portions of the grown material are etched away. The pattern which is etched will create the desired waveguide configuration. Etching results in a ridge upon which other materials are deposited. The resulting ridge will form the first isolation layer 32. First material 34 is then sputtered upon first isolation layer 32. In the preferred embodiment first isolation layer 32 and first material 34 are both made up of silicon dioxide ($SiO_2$), therefore one may not be able to distinguish these layers. This sputtering is done using ion beam sputtering techniques. A graded transition is then created whereby the material slowly changes from first material 34 to second material 44. A layer of second material 44 is then deposited. Next another transition occurs wherein materials change back to first material 34. This process is repeated a number of times depending upon the desired number of layers. Finally, second isolation layer 14 is deposited upon waveguide 36.

Occasionally it is desired to blend materials together, or dope one material with another. Using ion beam deposition, thin films of blended materials are easily and efficiently created.

Due to all of the advantages of ion beam deposition, waveguides that are fabricated using this process display very low losses.

Lastly, in order to further reduce the propagation loss in the waveguide, substrate 30, multiple-layer waveguide 36, and second isolation layer 14 are baked for a period of time. The temperature at which these devices are baked, and the time of the bake may vary with the particular application, but it is well known that this baking will reduce propagation losses for depositing waveguide materials.

While ion beam deposition is the preferred process of depositing multilayers of material it will be understood that other deposition processes may also be feasible. These other deposition processes include magnetron sputtering and chemical vapor deposition.

The multilayer structure of multilayer waveguide 36 provides many advantages over other optical waveguides. These advantages include unique mode structures which can be tailored for the particular application to which the waveguide is being used. These mode structures will depend upon the thickness of the particular layers and the number of layers used in multilayer waveguide 36.

Figure 5:
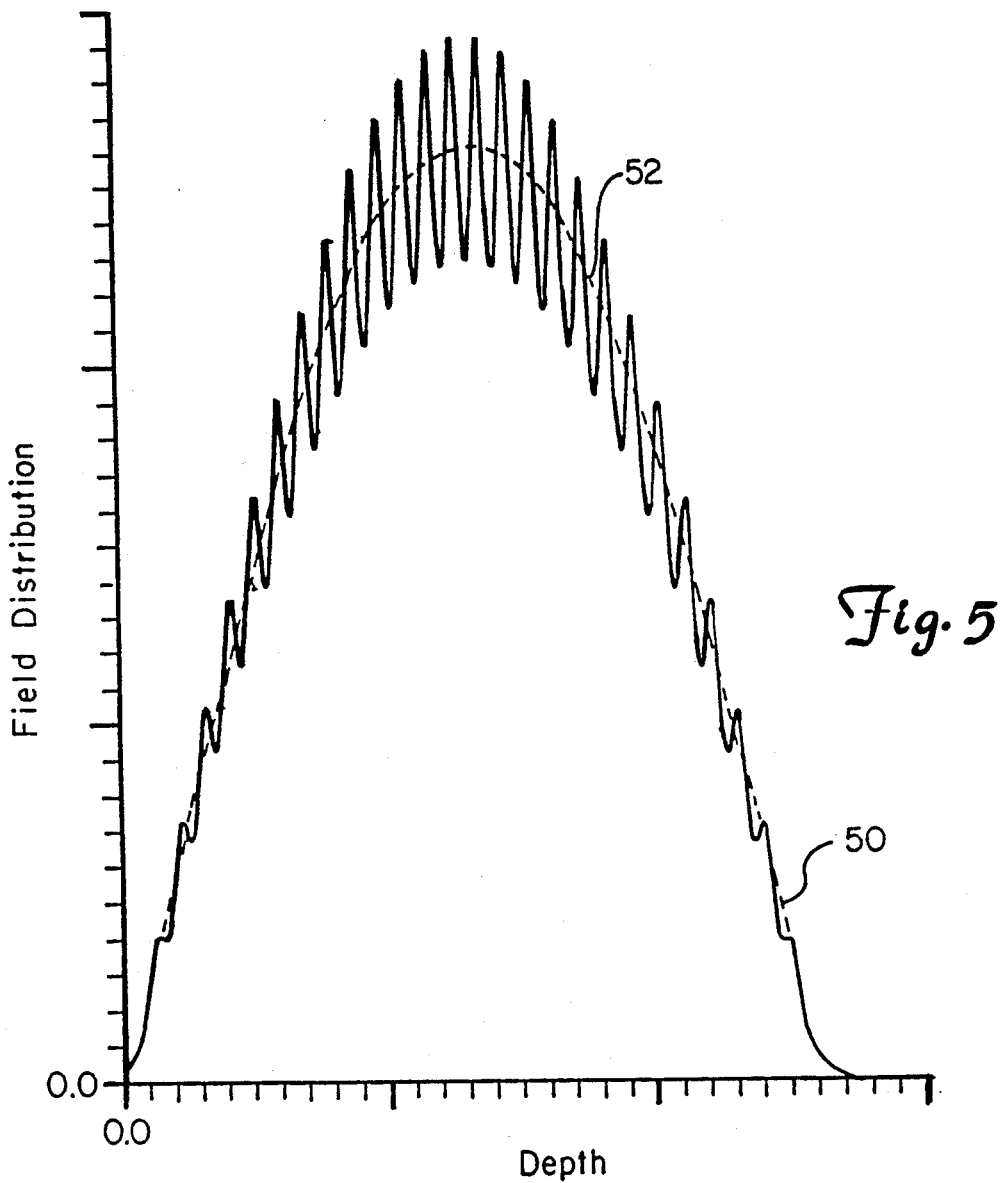
FIG. 5 is a graphical illustration of the field distribution within a waveguide utilizing the principles of the present invention.

FIG. 5 illustrates a field distribution 50 across multilayer waveguide 10. This field distribution is of the optical signal in its fundamental transverse electric mode. Those skilled in the art will recognize that this mode exists where the electric field is aligned transverse to the direction of propagation. The field distribution shown has a ripple upon it, but when this ripple is averaged, a very smooth distribution results. The average is shown by a dotted line 52. This average field distribution is evenly distributed and is heavily concentrated within multilayer waveguide 10 because of the high effective refractive index of the waveguide. The heavy concentration of the field within the waveguide provides for good discrimination against other modes. Furthermore, multilayer waveguide 10 is highly birefringent for excellent polarization discrimination. These characteristics provide for good single mode operation of the waveguide. The waveguide configuration can be altered to provide similar characteristics at different wavelengths.

Although multilayer waveguide 10 is made of many layers of material, it can operate as a single-mode waveguide or a multimode waveguide, depending on the number of layers, the layer indices of refraction and the layer thickness.

The birefringence inherent in waveguide 10 due to the different materials is very advantageous for single mode propagation within waveguide 10. The differences in the indices of refraction of the first material and the second material can be tailored to particular applications and requirements. Specifically, a single polarization single-mode waveguide can be constructed through a judicious choice of layer indices of refraction and layer thicknesses. This birefringence is related to the field distribution in FIG. 5.

Having described the principles of the invention in a preferred embodiment it should be apparent to those skilled in the art that the invention can be modified in arrangement and detail without departing from such principle. We claim all modifications coming within the spirit and scope of the following claims.

What is claimed is:

1. An optical waveguide for the transmission of light beams, comprising:
    a substrate having a planar surface;
    a multilayer stack having a plurality of alternating layers of a first material and a second material attached to the substrate, each layer of material having parallel planar surfaces in contact with the adjoining layers, a first layer attached to the planar surface of the substrate such that the planar surface of the first layer is in contact with the planar surface of the substrate, the first material having a low optical index of refraction and the second material having a high optical index of refraction, the first material and the second material both being attached to one another through the use of ion beam deposition; and a topcoat of material attached to and covering a last layer of the multilayer stack, the topcoat made of a material with a low optical index of refraction, the topcoat being deposited onto the multilayer stack by ion beam deposition.

2. The optical waveguide of claim 1 wherein the substrate is constructed of Zerodur.

3. The optical waveguide of claim 1 wherein the first material is silicon dioxide ($SiO_2$).

4. The optical waveguide of claim 1 wherein the second material is zirconium dioxide ($ZrO_2$).

5. The optical waveguide of claim 1 further comprising a first isolation layer situated between the substrate and the multilayer stack wherein the first isolation layer is a material having a low optical index of refraction.

6. An optical waveguide for the transmission of light beams, comprising:
a substrate having a surface; and
a waveguide means attached to the substrate surface comprised of a stack of a first material having a first index of refraction and a second material having a second index of refraction, the first index of refraction being lower than the second index of refraction, the first and second materials being configured such that the waveguide means has an oscillating concentration of the first material and the second material when traversing the waveguide means in a direction normal to the substrate surface.

7. The optical waveguide of claim 6 wherein the substrate is made up of a material having an optical index of refraction no higher than the first index of refraction.

8. The optical waveguide of claim 7 further comprising a second isolation layer covering the waveguide means wherein the second isolation layer is made up of a material having an index of refraction lower than or equal to the first index of refraction.

9. The optical waveguide of claim 8 wherein the substrate and the second isolation layer are silicon dioxide.

10. The optical waveguide of claim 6 further comprising a first isolation layer situated between the substrate and the waveguide means wherein the first isolation layer is made up of a material having an index of refraction lower than or equal to the first index of refraction.

11. The optical waveguide of claim 10 further comprising a second isolation layer covering the waveguide means wherein the second isolation layer is made up of a material having an index of refraction lower than or equal to the first index of refraction.

12. The optical waveguide of claim 11 wherein the second isolation layer covers both the top and the sides of the waveguide means.

13. The optical waveguide of claim 11 wherein the first isolation layer and the second isolation layer are made up of silicon dioxide.

14. The optical waveguide of claim 10 wherein the substrate is made of Zerodur.

15. The optical waveguide of claim 6 wherein the waveguide means is a rectangular channel.

16. The optical waveguide of claim 6 wherein the first material is silicon dioxide ($SiO_2$).

17. The optical waveguide of claim 6 wherein the second material is zirconium dioxide ($ZrO_2$) doped with silicon dioxide ($SiO_2$).

18. The optical waveguide of claim 6 wherein the waveguide means is fabricated using the method of ion beam sputter deposition.

19. An optical waveguide for the transmission of optical signals, comprising:
a substrate having a surface;
a lower isolation means attached to the substrate surface for containing optical signals, the lower isolation means made up of a material having a low optical index of refraction;
a waveguide means attached to the lower isolation means comprised of a stack of a first material having a first index of refraction and a second material having a second index of refraction, the first index of refraction being lower than the second index of refraction and the first index of refraction being no lower than the index of refraction of the lower isolation means, the first and second materials being configured such that the waveguide means has an oscillating concentration of the first material and the second material when traversing the waveguide means in a direction normal to the substrate surface; and
an upper isolation means covering the waveguide means for containing optical signals, the upper isolation means made up of material having an optical index of refraction not higher than the first index of refraction.

20. The optical waveguide of claim 19 wherein the upper isolation means covers both the top and the sides of the waveguide means.

21. The optical waveguide of claim 19 wherein the substrate is made of Zerodur.

22. The optical waveguide of claim 19 wherein the first material is silicon dioxide ($SiO_2$).

23. The optical waveguide of claim 19 wherein the second material is zirconium dioxide ($ZrO_2$) doped with silicon dioxide ($SiO_2$).

24. The optical waveguide of claim 19 wherein the lower isolation means and the upper isolation means are made up of silicon dioxide.

25. The optical waveguide of claim 19 wherein the waveguide means is fabricated using the method of ion beam sputter deposition.

26. A process for the fabrication of an optical waveguide, comprising the steps of:
a. depositing an isolation layer upon a substrate wherein the substrate is constructed of a material having a low index of thermal expansion, the isolation layer comprised of a material having a first index of refraction;
b. depositing a first layer of material upon the isolation layer, the first layer of material being deposited by ion beam deposition, wherein the material of the first layer has a second optical index of refraction, the second index of refraction being greater than or equal to the first index of refraction;
c. depositing a second layer of material upon the first layer of material wherein the material of the second layer has a third optical index of refraction, the third index of refraction being greater than the second index of refraction, and the material of the second layer is deposited upon the first layer by ion beam deposition; and d. depositing a topcoat upon the second layer of material wherein the topcoat is deposited upon the second layer by ion beam deposition, the topcoat comprised of a material having the first index of refraction.

* * * * *